United States Patent [19]

Hiraiwa

[11] Patent Number: 4,745,824
[45] Date of Patent: May 24, 1988

[54] MANUAL TRANSMISSION WITH MECHANISM FOR PREVENTING REVERSE GEAR SHIFT NOISE

[75] Inventor: Kazuyoshi Hiraiwa, Atsugi, Japan

[73] Assignee: Nissan Motor Co., Ltd., Yokohama, Japan

[21] Appl. No.: 812,406

[22] Filed: Dec. 23, 1985

[30] Foreign Application Priority Data

Jan. 25, 1985 [JP] Japan ................................. 60-13012
Jan. 25, 1985 [JP] Japan ................................. 60-13011
Feb. 1, 1985 [JP] Japan ............................ 60-13464[U]

[51] Int. Cl.⁴ ......................... F16H 3/38; B60K 41/26
[52] U.S. Cl. .................................... 74/475; 74/411.5; 74/477; 192/4 C
[58] Field of Search ..................... 74/473 R, 475, 476, 74/477, 411.5; 192/4 C, 4 A

[56] References Cited

U.S. PATENT DOCUMENTS

| | | | |
|---|---|---|---|
| 1,629,666 | 5/1927 | Keeler | 74/475 |
| 1,830,797 | 11/1931 | Lapsley | 74/476 |
| 1,951,876 | 3/1934 | Lapsley | 74/476 |
| 3,192,788 | 7/1965 | Fodrea | 74/476 |
| 3,545,295 | 12/1970 | Ravello | 74/339 |
| 3,939,724 | 2/1976 | Takahashi et al. | 74/475 |
| 4,174,644 | 11/1979 | Nagy et al. | 74/475 |
| 4,294,338 | 10/1981 | Simmons | 192/4 A |
| 4,467,665 | 8/1984 | Katayama et al. | 192/4 C X |
| 4,633,728 | 1/1987 | May | 74/476 |

FOREIGN PATENT DOCUMENTS 7716663 12/1978 Fed. Rep. of Germany .
57-137747 8/1982 Japan .
59-14655 4/1984 Japan .
59-73650 4/1984 Japan .

OTHER PUBLICATIONS

"Toyota Gijutsu (technique)", vol. 38, No. 2, p. 159, published by Toyota Motor Co., Ltd., Dec., 1983.

Primary Examiner—Randolph A. Reese
Assistant Examiner—Peter M. Cuomo
Attorney, Agent, or Firm—Foley & Lardner, Schwartz, Jeffery, Schwaab, Mack, Blumenthal & Evans

[57] ABSTRACT

In order to prevent gear noise in reverse gear shift of a synchromesh type manual transmission having a reverse fork rod for effecting the reverse gear shift with no synchronizer and at least one forward speed fork rod connected with a synchronizer, there is provided an engaging mechanism having translational member and rotational member one of which is mounted on the forward fork rod and the other of which is mounted on a select member for selecting one of the fork rods and shifting the selected fork rod. The translational and rotational members are engaged with each other so as to move the forward fork rod to actuate the synchronizer to facilitate the reverse shift when the reverse fork rod is selected and shifted. During this, the translational member moves rectilinearly along the axis of the forward fork rod, and the rotational member rotates so that the translational and rotational members are disengaged halfway to return the forward fork rod.

18 Claims, 8 Drawing Sheets

MANUAL TRANSMISSION WITH MECHANISM FOR PREVENTING REVERSE GEAR SHIFT NOISE

BACKGROUND OF THE INVENTION

The present invention relates to a mechanism of a manual transmissin for preventing gear clashing which is liable to occur when the transmission is shifted into reverse speed engagement.

In manual transmissions in general, the shift into reverse is unsynchronized, so that the reverse ' speed shift is liable to be noisy. Conventional mechanisms to avoid such a gear noise by using a synchronizer for forward speed are disclosed in Japanese patent provisional publication No. 57-137747, Japanese patent post-examination publication No. 59-14655, and U.S. Pat. No. 3,545,295.

These conventional mechanisms are arranged to actuate a forward speed synchronizer by transmitting a reverse shift movement of a driver's hand shift lever to the forward speed synchronizer through a pin and spring assembly, which causes such a result that an operating force for actuating the forward speed synchronizer is proportional to a biasing force of the spring. Accordingly, the magnitude of the operating force applied to the forward speed synchronizer is increased and decreased in dependence on the speed of the shift movement of the hand shift lever. For example, when the hand shift lever is shifted rapidly with a great force, the operating force is too weak to actuate the synchronizer, so that the speed of the transmission counter shaft cannot be decreased sufficiently and the gear noise cannot be prevented reliably. When, on the other hand, the hand shift lever is shifted slowly, the hand shift lever becomes so heavy that a large force is required to shift the lever.

Another similar conventional mechanism is shown in "Toyota Gijutsu (technique)", Vol. 38, No. 2, page 159, published by Toyota motor Co., Ltd. December, 1983. U.S. Pat. No. 4,294,338, and Japanese patent provisional publication No. 59-73650 show still another conventional mechanisms which use a synchronizing mechanism for a fifth speed to facilitate a reverse shift.

SUMMARY OF THE INVENTION

It is an object of the present invention to provide a manual transmission reverse gear shift noise preventing mechanism having a simple but reliable construction which can maintain a stable engagement between a synchronized forward fork rod and a select member shifting a reverse fork rod until a limited distance is traveled by the forward fork rod, and then ensure an automatic disengagement therebetween.

According to the present invention, the mechanism for a transmission having at least one synchronizer, has a first fork rod such as a reverse fork rod for effecting a first gear shift of the transmission by moving in a first direction from a first neutral position to a first shift position, a second fork rod such as a forward speed fork rod for effecting a second gear shift through the synchronizer by moving in a second direction from a second neutral position to a second shift position, a select member for selecting one of the first and second fork rod, and an engaging means. The first and second fork rods have first and second brackets, respectively. The select member can move the first fork rod when the select member is in a first select posture in which the select member is engaged with the first bracket. The select member can move the second fork rod when the select member is engaged with the second bracket. The engaging means comprises a first means mounted on the select member and a second means mounted on the second fork rod. The first and second means are placed in an engaged relation with each other when the select member is put in the first select posture. The first and second means are disengaged from each other when the first fork rod is moved through a predetermined distance from the first neutral position in the first direction by the select member.

DETAILED DESCRIPTION OF THE INVENTION

Figure 1:
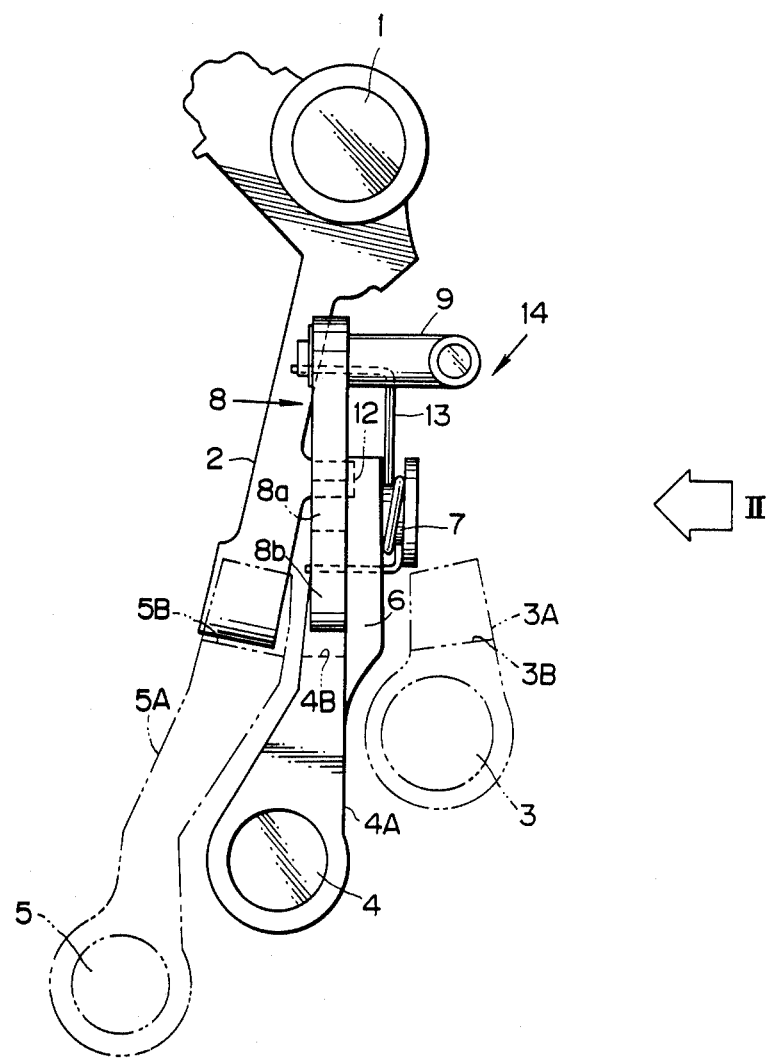
FIG. 1 is a front view showing a first embodiment of the present invention.
Figure 2:
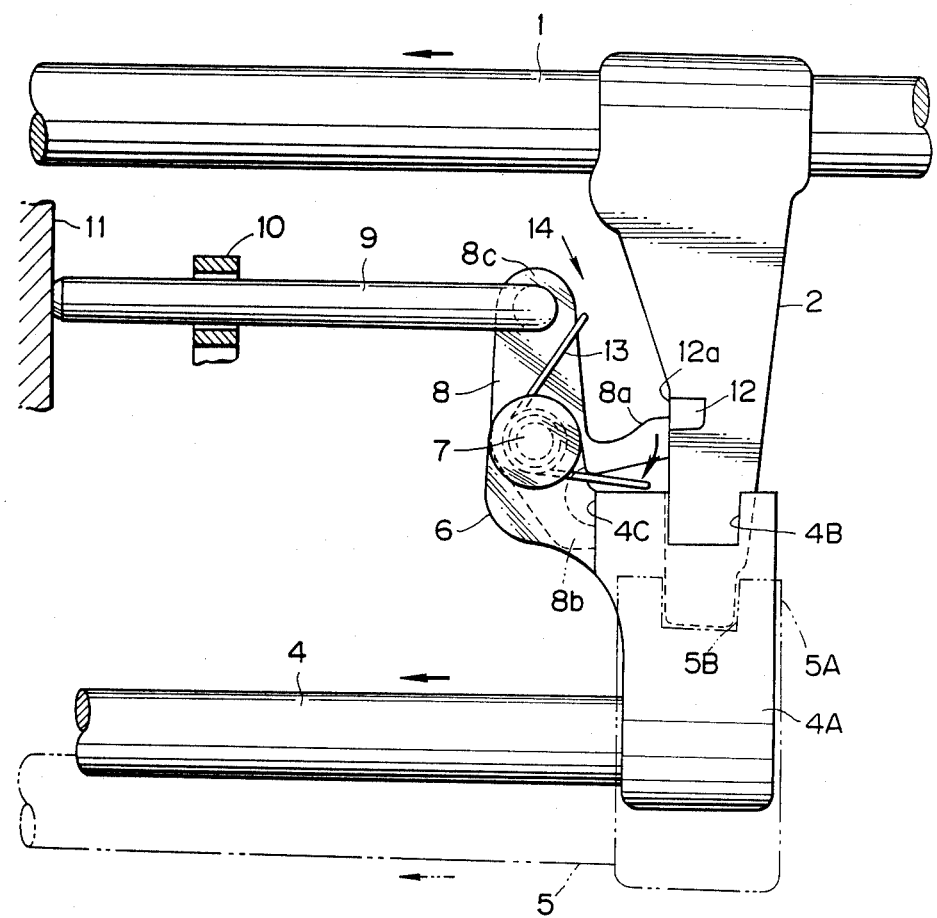
FIG. 2 is a side view taken in a direction shown by an arrow II in FIG. 1.
Figure 3:
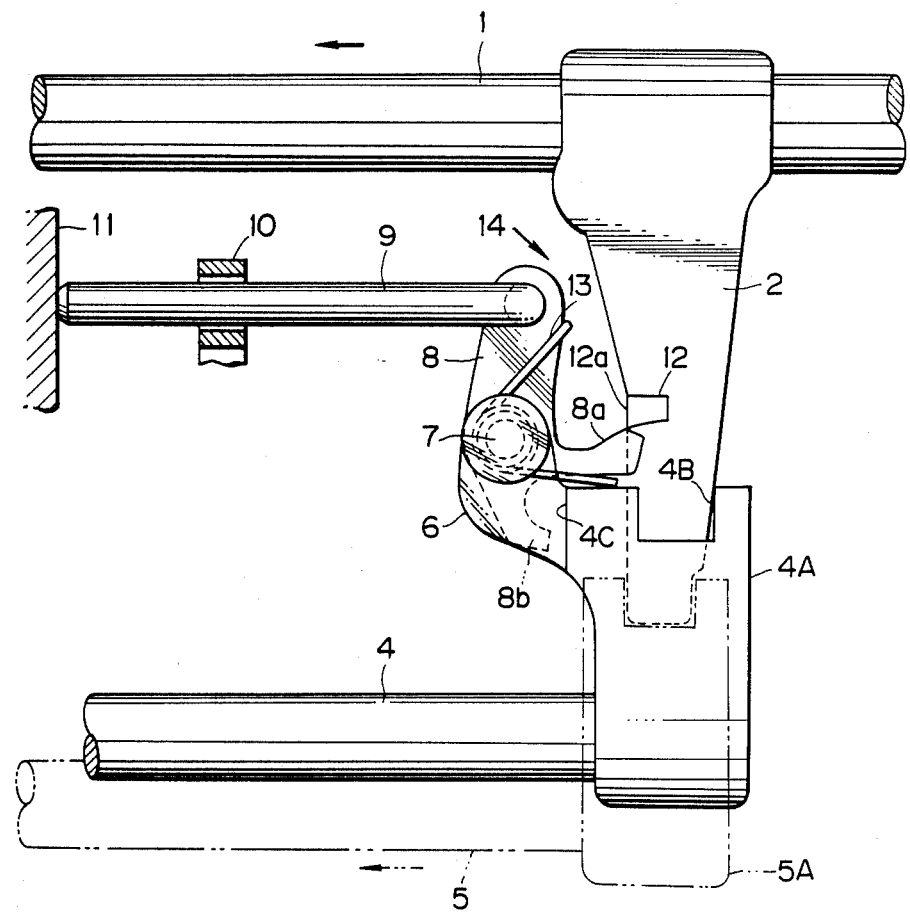
FIG. 3 is a side view similar to FIG. 2, for showing the operation of the first embodiment.

A first embodiment of the present invention is shown in FIGS. 1–3. A manual transmission of a vehicle has a manually operable change lever (or a gear shift lever) swingable on a spherical surface supported in an upper interior part of a quadrant box mounted on a transmission case, and a gear shift linkage mechanism which is disposed in the transmission case for selecting one of forward gears and a reverse gear by transmitting movements of the change lever to a gear system of the transmission.

As shown in FIGS. 1 and 2, the gear shift mechanism has a striking rod 1 which is connected with the change lever (not shown) so that the striking rod 1 can move axially and rotate in accordance with the movements of the change lever. A select lever 2 is fixedly mounted on the striking rod 1 so that the select lever 2 moves together with the striking rod 1. The gear shift mechanism further has a first-second speed fork rod 3, a third-fourth speed fork rod 4 and a reverse and fifth speed fork rod 5. Each of the fork rods 3, 4 and 5 has a shift fork which is fixed to the fork rod 3, 4 or 5 and arranged to shift a sleeve of one synchronizers for the forward speeds. The striking rod 1 and the fork rods 3, 4 and 5 are supported on the transmission case in such a manner that all of the rods 1, 3, 4 and 5 are parallel to a main shaft of the transmission for transmitting driving torque to driving wheels of the vehicle and that all are axially slidable. The striking rod 1 is further rotatable about its own axis. Each of the fork rods 3, 4 and 5 has an input end closer to the change lever and an output end remoter from the change lever than the input end. Brackets 3A, 4A and 5A are fixed, respectively, to the input ends of the fork rods 3, 4 and 5. The brackets 3A, 4A and 5A are formed with recesses 3B, 4B and 5B, respectively. A projecting end of the select lever 2 can be selectively engaged with one of the recesses 3B, 4B and 5B. When the change lever is moved to a reverse posture by a selecting operation of the driver, the select lever 2 is engaged with the recess 5B of the bracket 5A of the reverse and fifth speed fork rod 5. When the change lever is further moved to a reverse position by a shifting operation of the driver while the change lever remains in the reverse posture, then the fork rod 5 is moved axially to its reverse position. Consequently, a reverse idler gear is shifted by the fork rod 5, and the main shaft of the transmission is connected with a counter shaft through the reverse idler gear. FIGS. 1 and 2 show the gear shift mechanism in the state in which the select lever 2 is engaged with the recess 5B of the reverse fork rod 5.

In this embodiment, the bracket 4A of the third and fourth speed fork rod 4 lying next to the reverse fork rod 5 is formed with a support portion 6 which projects upwardly toward the striking rod 1 from an end surface 4C of the bracket 4A facing toward the output end of the fork rod 4. A top end of the support portion 6 supports a rotational engaging member 8 of a plate shape through a pin 7. The engaging member 8 is rotatable about the pin 7 in a plane which is substantially vertical in this embodiment, and which is substantially parallel to the striking rod 1 and the fork rods 3, 4 and 5. The engaging member 8 has a restrained arm 8c whose end is rotatably connected with a first end of a restraining rod 9. The rod 9 extends in parallel to the striking rod 1 toward the output end of the fork rod 4 from the first end to a second end of the rod 9. The rod 9 is supported axially slidably by a guide 10. A length of the rod 9 is determined so that the second end of the rod 9 abuts on a surface of the transmission case 11 when the change lever is put in the reverse posture and accordingly the select lever 2 is put in its reverse posture. The engaging member 8 has an engaging arm 8a and a returning arm 8b. The end of the engaging arm 8a abuts on a projection 12 formed in the select lever 2, and the end of the returning arm 8b abuts on the end surface 4C of the bracket 4A when the change lever is put in the reverse posture. The projection 12 projects rightwardly as viewed in FIG. 1 from a side of the select lever 2 which faces toward the bracket 4A of the third and fourth speed fork rod 4 when the select lever 2 is in the reverse posture in which the select lever is engaged with the recess 5B of the reverse fork rod 5. The projection 12 has an end surface 12a facing (leftwardly as viewed in FIG. 2) toward the output end of the fork rod 4, and the end surface of the engaging arm 8a of the engaging member 8 faces oppositely toward the change lever. When the change lever is put in the reverse posture, the end surface 12a of the projection 12 of the select lever 2 abuts on the end surface of the engaging arm 8a of the engaging member 8. Accordingly, the projection 12 causes the third and fourth fork rod 4 to move toward the fourth speed side leftwardly as viewed in FIG. 2 by pushing the engaging arm 8a in the same direction when the change lever is shifted to the reverse position in the reverse posture. During this leftward movement of the third and fourth fork rod 4, the pin 7 moves in the same direction with the fork rod 4 whereas the end of the restrained arm 8c of the engaging member 8 is prevented from moving leftwardly by the rod 9. Therefore, the engaging arm 8a of the engaging member 8 rotates in the clockwise direction as viewed in FIG. 2 about the first end of the rod 9 which is rotatably connected with the restrained arm 8c of the engaging member 8, together with the leftward movement of the fork rod 4. The engaging arm 8a is disengaged from the projection 12 of the select lever 2, as shown in FIG. 3, when the fork rod 4 is moved through a predetermined distance toward the fourth speed side, and reaches a predetermined intermediate position. When the third and fourth speed fork rod 4 is in this predetermined intermediate position, the synchronizer for the fourth speed is just placed in a balk state in which rotating speeds are synchronized. A return spring 13 is supported on the pin 7 and disposed between the bracket 4A of the third and fourth speed fork rod 4 and the engaging member 8 so that the engaging member 8 is biased to rotate in the counterclockwise direction as viewed in FIGS. 2 and 3 about the pin 7. When the engaging arm 8a is disengaged from the projection 12, the end of the returning arm 8b abuts against the end surface 4C of the bracket 4A and returns the third and fourth speed fork rod 4 to its neutral position by the aid of the biasing force of the spring 13. Thus, the support portion 6, the engaging member 8, the pin 7, the rod 9, the projection 12 and the spring 13 constitute an engaging mechanism 14 of this embodiment.

The mechanism of the first embodiment is operated as follows:

When the driver brings the vehicle to a stop and moves the change lever to the reverse posture, then the select lever 2 is engaged with the recess 5B of the bracket 5A, as shown in FIGS. 1 and 2, so that the reverse and fifth speed fork rod 5 is selected. At the same time, the projection 12 of the select lever 2 comes in contact with the engaging arm 8a of the engaging member 8. Therefore, the select lever 2 is engaged with the third and fourth speed fork rod 4 in such a manner that the select lever 2 can shift the fork rod 4 in the same direction as the direction of the reverse and fifth speed fork rod 5 toward the reverse gear side.

When the driver shifts the change lever toward the reverse shift position while maintaining the change lever in the reverse posture in which the reverse and fifth speed fork rod 5 is selected, then the reverse and fifth speed fork rod 5 moves axially toward the reverse side, and simultaneously the third and fourth fork rod 4 moves axially in the same direction toward the fourth speed side according as the select lever 2 is moved leftwardly as shown in an arrow in FIG. 2 by the change lever through the striking rod 1. As the third and fourth speed fork rod 4 moves toward the fourth speed side in this way, the fork rod 4 actuates the fourth speed synchronizer by shifting the sleeve of the synchronizer with the shift fork. When the fork rod 4 reaches the predetermined intermediate position which is at the predetermined distance apart from the neutral position of the fork rod 4 in the axial direction toward the fourth speed side, then the engaging member 8 rotates through a predetermined angular displacement and the engaging arm 8a becomes disengaged from the projection 12. Therefore, the three and fourth fork rod 4 does not move further beyond the predetermined intermediate position toward the fourth speed shift position. In this case, the synchronizer is brought to the balk state by the movement of the fork rod 4 to the predetermined intermediate position. Therefore, the rotation speed of the countershaft which is rotating by inertia, and the speed of the main shaft which is held stationary are synchronized, so that the counter shaft is braked to a stop.

When the engaging arm 8a is disengaged from the projection 12, then the engaging member 8 rotates about the first end of the rod 9 in the counterclockwise direction in FIG. 3 by receiving the biasing force of the spring 13, and pushes the bracket 4A with the returning arm 8b. Therefore, the third and fourth fork rod 4 returns from the intermediate position to the neutral position. When the change lever is further shifted to the reverse shift position, the select lever 2 moves only the reverse fork rod 5, which in turn shifts the reverse idler gear with the shift fork until the reverse ilder gear comes into mesh with an reverse counter gear and a reverse gear. In this case, the rotation of the reverse counter gear has been already stopped, so that the reverse idler gear and the reverse counter gear are engaged smoothly and silently without gear noise. The engaging mechanism 14 of the first embodiment can reliably maintain the engaged relation between the select lever 2 and the third and fourth fork rod until the predetermined intermediate position is reached. Therefore, the mechanism of the first embodiment can transmit an operating force to the synchronizer in a very reliable manner irrespectively of the shifting speed of the change lever.

Figure 4:
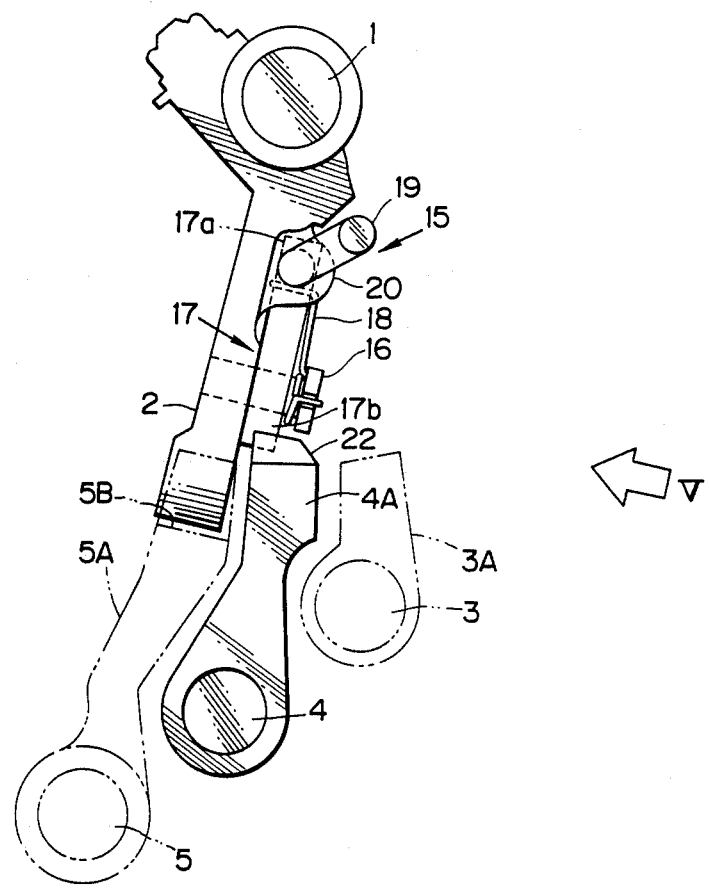
FIG. 4 is a front view showing a second embodiment of the present invention.
Figure 5:
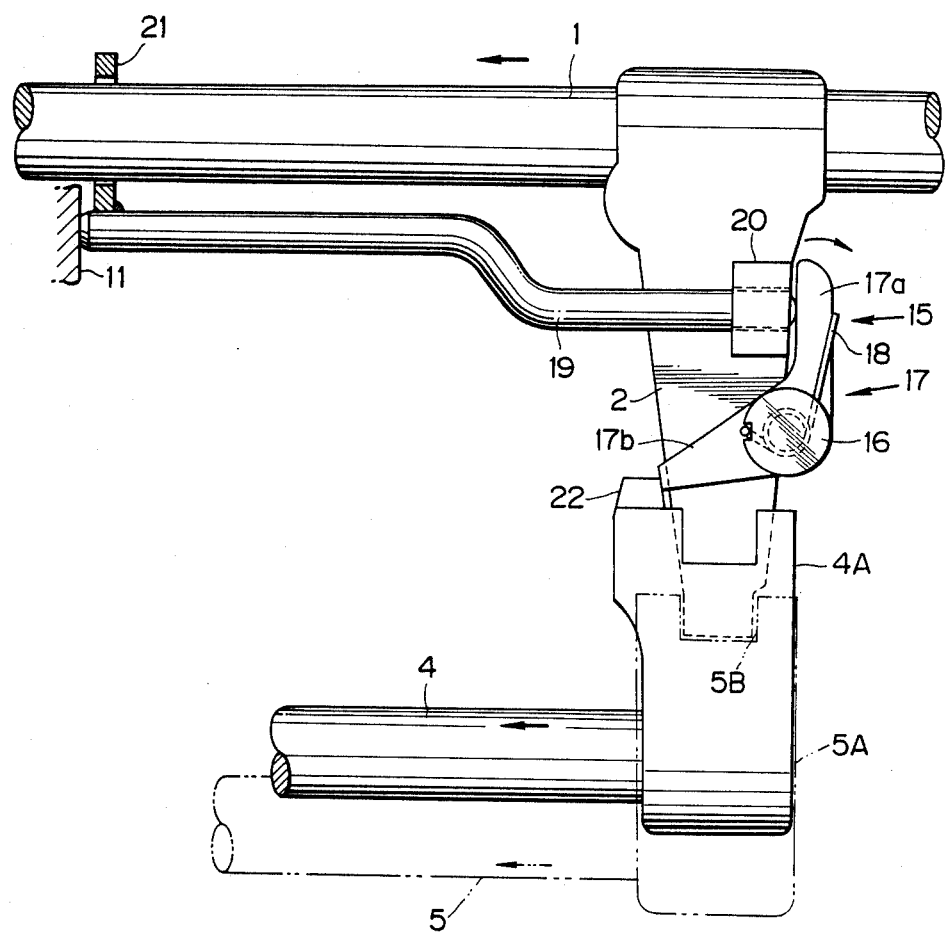
FIG. 5 is a side view take in a direction shown by an arrow V in FIG. 4.
Figure 6:
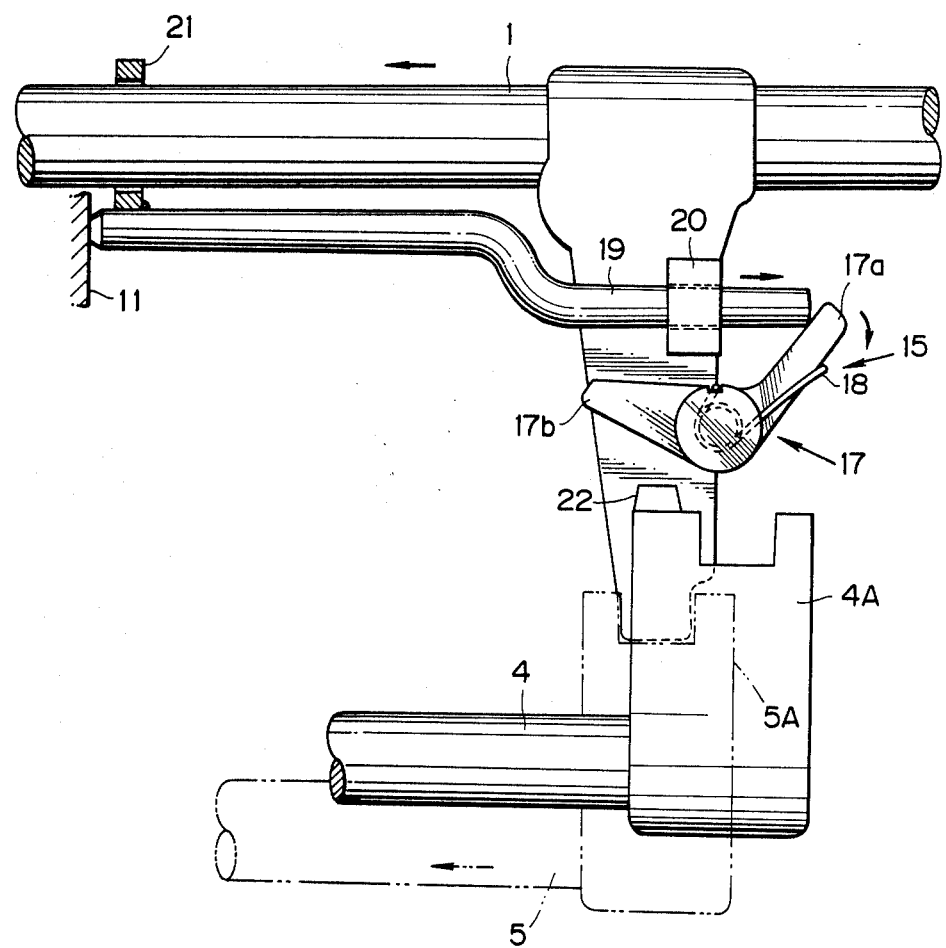
FIG. 6 is a side view similar to FIG. 5, for showing the operation of the second embodiment.

A second embodiment of the present invention is shown in FIGS. 4-6. The mechanism of the second embodiment is different from the mechanism of the first embodiment only in the engaging mechanism. In the remaining points, both embodiments are identical to each other.

An engaging mechanism 15 of the second embodiment has an engaging member 17 mounted on the select lever 2 on one side through a pin 16 in such a manner that the engaging member 17 can rotate about the pin 16 in a plane which is vertical and parallel to the striking rod 1 and the fork rods 3, 4 and 5. The engaging member 8 has a restrained arm 17a and a engaging arm 17b. A spring 18 is disposed between the restrained arm 17a and the pin 16 so as to bias the engaging member 17 to rotate in the counterclockwise direction in FIG. 5. The restrained arm 17a of the engaging member 17 abuts on a first end of a restraining rod 19 so as to limit the counterclockwise rotation of the engaging member 17. The restraining rod 19 extends from the first end to a second end approximately in parallel to the striking rod 1 in the direction toward the reverse gear side. The first end of the restraining rod 19 is inserted through a guide 20 fixed to the side of the select lever 2. The second end of the restraining rod 19 is fixed to a guide 21 which is mounted slidably over te striking rod 1. The rod 19 has such a length that the second end of the rod 19 abuts on the surface of the transmission case 11 when the change lever is put in the reverse posture. The bracket 4A of the third and fourth speed fork rod 4 is formed with a projection 22 which projects from the top of the bracket 4A. The projection 22 has front and rear faces which face in the opposite axial directions of the fork rod 4 and which are inclined oppositely with respect to a vertical plane perpendicular to the striking rod 1 so as to form a trapezoidal sectional shape of the projection 22 as shown in FIG. 5. When the change lever is placed in the reverse posture, the end of the engaging arm 17b of the engaging member 17 abuts on the rear face of the projection 22, so that the select lever 2 is engaged with the third and fourth speed fork rod 4 in such a manner that the select lever 2 can push the fork rod 4 in the same direction as the axial direction of the reverse fork rod toward the reverse side. When the change lever in the reverse posture is shift to the reverse shift position, the select lever 2 causes the reverse and fifth speed fork rod 5 to move axially toward the reverse gear side, and simultaneously causes the third and fourth speed fork rod 4 to move axially in the same direction toward the fourth speed side. During this shift movement of the select lever 2, the first end of the restraining rod 19 limits the end of the restrained arm 17a of the engaging member 17 from moving rectilinearly in the axial direction toward the reverse gear side. By so doing, the restraining rod 19 causes the engaging member 17 to rotate in the clockwise direction in FIG. 5. When the three and fourth speed fork rod 4 reaches a predetermined intermediate position by moving through a predetermined distance from the neutral position toward the fourth speed side, then the engaging member 17 reaches an angular position in which the engaging arm 17b is disengaged from the projection 22 of the bracket 4A, as shown in FIG. 6. Therefore, a further movement of the select lever 2 in the leftward direction as viewed in FIG. 6 causes only the reverse fork rod 5 to move leftwardly to shift the reverse idler gear until the reverse idler gear is engaged with the reverse counter gear and the reverse gear. In this case, the three and fourth fork rod 4 actuates the synchronizer connected therewith by moving axially through the predetermined distance, so that the mechanism of the second embodiment can make the reverse gear shift smooth and silient by firmly stopping the rotation of the counter shaft in advance, as in the first embodiment.

The engaging mechanisms 14 and 15 of the first and second embodiments can maintain the engagement between the select lever 2 and forward fork rod 4 until the predetermined intermediate position is reached, in such a reliable manner that an operating force can be transmitted efficiently to the synchronizer even if the change lever is shifted rapidly and that the shifting operation of the change lever is not made heavy even if the change lever is shifted slowly.

Figure 7:
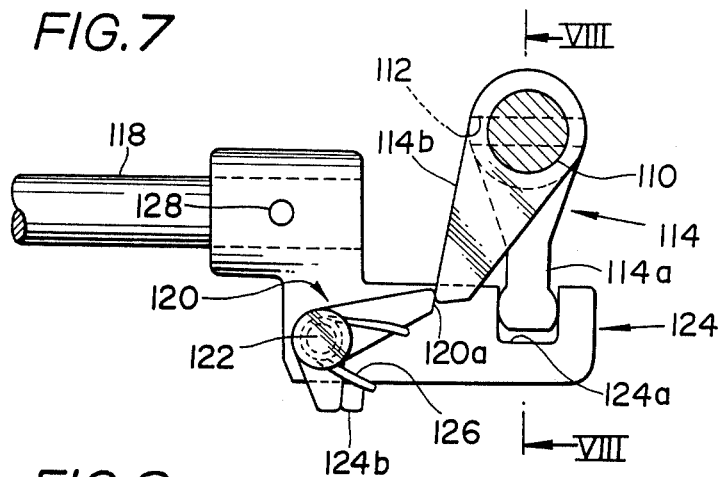
FIG. 7 is a side view showing a third embodiment of the present invention.
Figure 8:
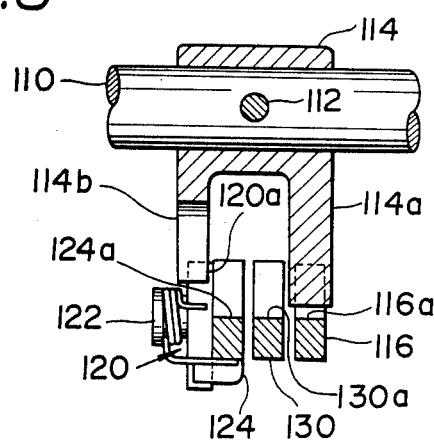
FIG. 8 is a sectional view taken on a plan of a line VIII—VIII in FIG. 7.
Figure 9:
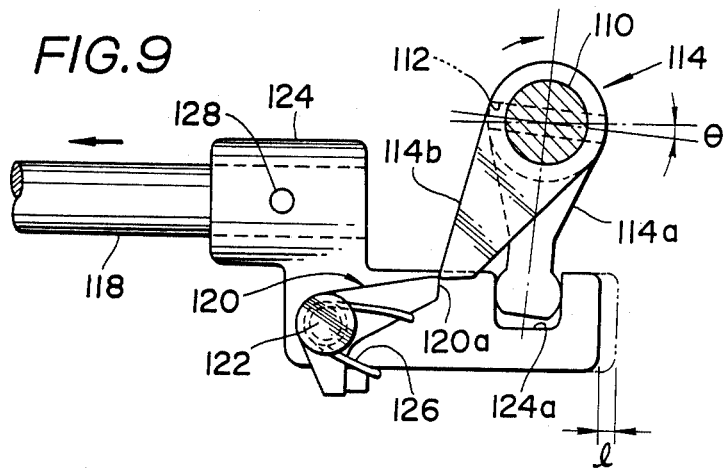
FIG. 9 is a side view for showing the operation of the third embodiment.

A third embodiment of the present invention is shown in FIGS. 7-9.

A striking rod 110 is connected with a change lever (not shown) so that the striking rod 110 slides axially and rotates in accordance with the selecting and shifting operations of the change lever. A select member (or a shifter) 114 is fixed to the striking rod 110 by a pin 112. The select member 114 has a select arm 114a extending downwardly from a right end of the select member 114 as viewed in FIG. 8, and an actuating arm 114b extending downwardly from a left end of the select member 114.

As shown in FIG. 8, first, second and third brackets 116, 124 and 130 have, respectively, recesses 116a 124a and 130a one of which can be selectively engaged with the end of the select arm 114a of the select member 114. The first, second and third brackets 116, 124 and 130 are fixed, respectively, to input ends (right ends as viewed in FIG. 7) of first fork rod (or a reverse fork rod), second fork rod 118 and third fork rod which are parallel to one another. The first fork rod lies behind the second fork rod 118 as viewed in FIG. 7, and the third fork rod lies between the first and second fork rods. As shown in FIG. 7, a pin 128 connects the second bracket 124 to the second fork rod 118 fixedly.

A cam lever (translational lever) 120 is rotatably mounted on the second bracket 124 through a pin 122. The cam lever 120 has an engaging arm 120a. In the state shown in FIGS. 1 and 2 in which the select arm 114a of the select member 14 is received in the recess 116a of the first bracket 116, the actuating arm 114b of the select member 114 abuts on the end of the engaging arm 120a of the cam lever 120. A spring 126 is disposed between the bracket 124 and the cam lever 120 so that the cam lever 120 is biased to rotate in the counterclockwise direction in FIG. 7. The counterclockwise rotation of the cam lever 120 is limited by a stopper projection 124b formed in the second bracket 124.

In accordance with the movement of the change lever, the select arm 114a of the select member 114 is engaged selectively with one of the recesses 116a, 124a and 130a of the first, second and third brackets 116, 124 and 130. In this embodiment, a vertical plane passing through the axis of the striking rod 110 is substantially perpendicular to a vertical plane passing through the axis of each of the first, second and third fork rods, as shown in FIG. 7. The first fork rod having the first bracket 116 fixed thereto is arranged to shift the transmission to the reverse engagement for reversing the main shaft without using any synchronizer when the first fork rod is moved axially in a reverse gear shift direction which is leftward in FIG. 7, by the select member 114 held in a reverse posture in which the select arm 114a is engaged with the recess 116a of the first bracket 116. The second fork rod 118 having the second bracket 124 fixed to the input end further has a shift fork which is fixed to an output end opposite to the input end and which is arranged to shift the transmission to a first speed engagement or a second speed engagement through a synchronizer by being moved leftwardly or rightwardly together with the fork rod 118 by the select arm 114a of the select member engaged with the recess 124a of the second bracket 124. The third fork rod having the third bracket 130 is arranged to shift the transmission to a third speed engagement or a fourth speed engagement through a synchronizer by being moved leftwardly or rightwardly by the select arm 114a held engaged with the recess 130a of the third bracket 130.

The mechanism of the third embodiment is operated as follows: The movements of the change lever caused by the driver is transmitted through the striking rod 110 to the select member 114. By receiving the movements of the change lever, the select member 114 engages its select arm 114 with one of the recesses 116a, 124a and 130 of the first, second and third brackets 116, 124 and 130, and shifts the transmission selectively to one of the first, second, third and fourth forward speed states and the reverse state. When the select member 114 is in the reverse posture shown in FIGS. 1 and 2 in which the select arm 114a is engaged with the recess 116a of the first bracket 116, the actuating arm 114b of the select member 114 abuts on the engaging arm 120a of the cam lever 120 as shown in FIG. 7. Therefore, when the select arm 114a moves the first fork rod in the reverse shift direction through the first bracket 116, then the actuating arm 114b moves the second fork rod 118 in the same direction through the cam lever 120 and the second bracket 124. The actuating arm 114 pushes the engaging arm 120a of the cam lever 120 by rotating about the axis of the striking rod 110. As shown in FIG. 9, the actuating arm 114b is disengaged from the engaging arm 120a when the angular displacement of the select member 114 in the clockwise direction in FIG. 9 amounts to a predetermined angle $\theta$, and the corresponding rectilinear displacement of the second bracket 124 and the second fork rod 118 amounts to a predetermined distance $\lambda$. The distance $\lambda$ traveled by the second fork rod 118 is so determined that the fork rod 118 brings the synchronizer into the baulk state in which the synchronizing operation is completed. Therefore, in the state shown in FIG. 9, the synchronizer connected with the fork rod 118 decreases the rotational speed of the counter shaft of the transmission to zero in agreement with the main shaft which is held stationary by the vehicle road wheels at rest. After that, the second fork rod 118 stops moving, and only the first fork rod continues moving in the reverse shift direction until the reverse shift is accomplished. In this case, the reverse idler gear is engaged with the reverse counter gear silently and smoothly because the reverse idler gear supported on the reverse counter shaft is held stationary. In the mechanism of the third embodiment, too, a force for actuating the synchronizer is transmitted from the select member 114 to the forward fork rod 118 in a stable manner without being affected by the shifting speed.

After the cam lever 120 is disengaged from the actuating arm 114b of the select member 114, the second fork rod 118 is restored to the neutral position shown in FIG. 7 by restoring means such as a spring. When the first fork rod returns from the reverse shift position to the netural position, the actuating arm 114b of the select member 114 abuts on an upper surface of the engaging arm 120a of the cam lever 120, and causes the cam lever 120 to rotate in the clockwise direction in FIG. 7 about the pin 122. Therefore, the select member 114 can returns to the neutral position shown in FIG. 7 smoothly. Thereafter, the cam lever 120 returns to the original position shown in FIG. 7 by the aid of the biasing force of the spring 26.

The first fork rod of the third embodiment may be arranged to provide a fifth speed by moving in the direction opposite to the reverse shift direction.

Figure 10:
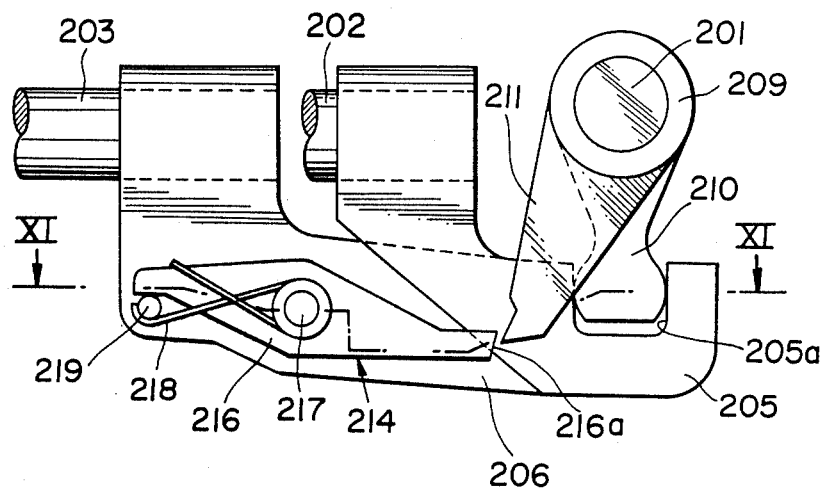
FIG. 10 is a side view showing a fourth embodiment of the present invention.
Figure 11:
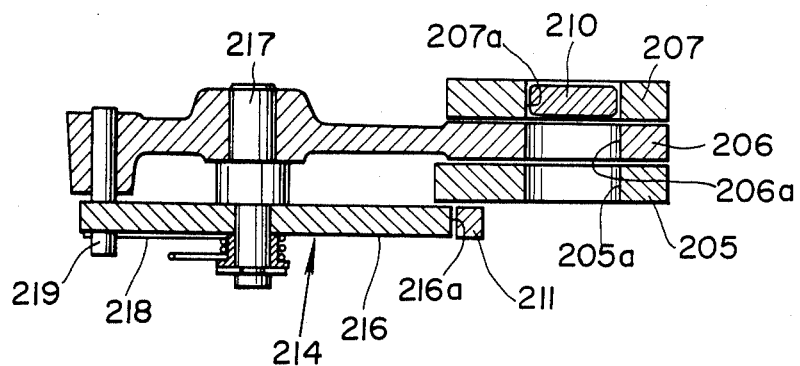
FIG. 11 is a sectional view taken across a line XI—XI in FIG. 10.

A fourth embodiment of the present invention is shown in FIGS. 10 and 11. The mechanicam of the fourth embodiment is arranged to prevent gear noise of the reverse gear shift by using the synchronizer for high speed which is superior in ability of synchronization.

As shown in FIG. 10, a first and second speed fork rod (forward low speed fork rod) 202, a three and fourth speed fork rod (forward high speed fork rod) 203 and a reverse fork rod extend along a first straight line in parallel to one another. A striking rod (control shaft) 201 extends along a second straight line perpendicular to the first straight line, as shown in FIG. 10. The striking rod 201 is connected with the change lever disposed near a driver's seat of the vehicle through a linkage. The striking rod is moved axially by a selecting operation of the change lever. The striking rod 201 is rotated about its own axis by a shifting operation of the change lever. The reverse fork rod 204 engages the reverse idler gear with the reverse gear provided in the transmission output shaft to select the reverse engagement by moving axially in the reverse shift direction which is leftward as viewed in FIG. 10. The first and second speed fork rod 202 selects the forward first speed through a first speed synchronizer mechanism (not shown) by moving in the rightward direction (in FIG. 10) opposite to the reverse shift direction, and selects the forward second speed through a second speed synchronizer mechanism by moving in the leftward direction identical to the reverse shift direction. The third and fourth speed fork rod 203 selects the forward third speed through a third speed synchronizer mechanism by moving in the rightward direction opposite to the reverse shift direction, and selects the forward fourth speed through a fourth speed synchronizer mechanism by moving in the leftward direction identical to the reverse shift direction.

Brackets 205, 206 and 207 are fixed, respectively, to input ends (right ends as viewed in FIG. 10) of the, fork rods 202, 203 and 204. The brackets 205, 206 and 207 are formed, respectively, with recesses 205a, 206a and 207a which are aligned in the neutral state shown in FIG. 11. A select member (shifter) 209 is fixed to the striking rod 201. The select member 209 is formed integrally with a select arm 210 which is slidable along the recesses 205a, 206a and 207a. The select member 209 further has an actuating arm 211 formed integrally. As shown in FIG. 11, the three and fourth speed bracket 206 is interposed between the reverse bracket 207 and the first and second speed bracket 205, and the brackets 205 and 206 are placed between the select arm 210 and the actuating arm 211 of the select member 209 when the select member 209 is in the reverse posture shown in FIG. 11 in which the select arm 210 is received in the recess 207a of the reverse bracket 207.

A two-armed lever 216 is rotatably mounted on the three and fourth speed bracket 206 by a shaft 217. The lever 216 and the actuating arm 211 of the select member 209 are placed in the same plane. The two-armed lever 216 has a first arm having a end surface 216a and a second arm which is biased to rotate in the counterclockwise direction in FIG. 10 by a torsion coil spring 218. The counterclockwise rotation of the second arm of the lever 216 about the shaft 217 is limited by a stopper pin 219 fixed to the bracket 206. When the lever 216 is in the limit position shown in FIG. 10 in which the stopper pin 219 limits the counterclockwise rotation of the lever 216, and simultaneously the select member 209 is in the reverse select posture in which the select arm is received in the recess 207a of the reverse bracket 207, the end surface 216a of the first arm of the lever 216 is engaged with the end of the actuating arm 211 of the select member 209 in such a manner that the actuating arm 211 can push the lever 216 in the reverse shift direction.

When the select member 209 in the reverse select posture shown in FIG. 10 is rotated in the clockwise direction in FIG. 10 by a reverse shifting operation of the driver, the actuating arm 211 rotates together with the select arm 210, and move the three and fourth speed fork rod 203 leftwardly in FIGS. 10 and 11 toward the fourth speed side by pushing the end 216a of the first arm of the two-armed lever 216. Therefore, the three and fourth fork rod 203 actuates the fourth speed synchronizer mechanism to assist the reverse gear shift by braking the rotation of the input shaft of the transmission.

Thereafter the actuating arm 211 moves away from the first arm of the two-armed lever 216 by rotating, so that the axial movement of the fork rod 203 is interrupted to prevent simultaneous engagement of two gears. When the reverse fork rod 204 is returned from the reverse shift position to the neutral position, the actuating arm 211 can swing back to the neutral position because the actuating arm 211 causes the two-armed lever 216 to rotate in the clockwise direction in FIG. 10 by pushing the first arm against the spring 218 on the way to the neutral position.

In the fourth embodiment, the reverse gear shift is assisted by a synchronizer for a high speed such as a fourth speed synchronizer which has a high capacity of synchronizing. Therefore, the gear noise in the reverse gear shift is prevented reliably by a sufficient bracking force for stopping the rotation of the input shaft. Besides, an operating force for required for the reverse gear shift is not increased.

What is claimed is:

1. A mechanism for a transmission having at least one synchronizer, comprising:

a first fork rod for effecting a first gear shift of the transmission by moving in a first direction from a first neutral position to a first shift position, said first fork rod having a first bracket, a second fork rod connected with the synchronizer for effecting a second gear shift of the transmission through the synchronizer by moving in a second direction from a second neutral position to a second shift position said second fork rod having a second bracket, a select member capable of moving said first fork rod when said select member is in a first select posture in which said select member is engaged with said first bracket, and moving said second fork rod when said select member is in a second select posture in which said select member is engaged with said second bracket, and engaging means comprising first means mounted on said select member and second means mounted on said second fork rod, said first and second means being placed in an engaged relation with each other when said select member is put in said first select posture, said first and second means being disengaged from each other when said first fork rod is moved through a predetermined distance from said first neutral position in said first direction by said select member in said first select posture, wherein said first and second fork rods are placed substantially in parallel to each other so that said first and second directions are axial directions toward a side of said transmission, and wherein one of said first and second means is translational means and the other of said first and second means is rotational means, said translational and rotational means being arranged so that said translational means travels a rectilinear path in said second direction and simultaneously said rotational means rotates about a rotation axis perpendicular to a plane substantially parallel to said rectilinear path according as said select member in said first select posture moves said first fork rod in said first direction from said first neutral position and simultaneously moves said second fork rod in said second direction from said second neutral position with said first and second means.

2. A mechanism according to claim 1 wherein said select member is fixedly mounted on a striking rod extending substantially in parallel to a straight line perpendicular to said second fork rod so that said select member can select one of said first and second brackets by moving along the axis of said striking rod and cause each of said first and second fork rods to move axially by rotating about the axis of said striking rod, and wherein said rotational means comprises an actuating arm integral with said select member, and said translational means is mounted on said second bracket.

3. A mechanism according to claim 2 wherein said translational means comprises a translational lever which is swingably mounted on said second bracket, said translational lever having an engage arm which is engaged with said actuating arm of said select member when said select member is in said first select posture.

4. A mechanism according to claim 3 wherein said translational lever is biased to swing in a biased direction by a spring, and is normally held in a limit position by a stopper projection formed in said second bracket for limiting said translational lever from swinging in said biased direction, said translational lever being held in said limit position while said actuating arm moves said second fork rod from said second neutral position in said second direction by pushing said engage arm of said translation lever by rotating in a shift direction, said translational lever allowing said actuating arm to rotate in a direction opposite to said shift direction by being rotated in a direction opposite to said biased direction by said actuating arm.

5. A mechanism according to claim 4 further comprising a third fork rod having a third bracket disposed between said first and second brackets, and wherein said first gear shift is a reverse gear shift.

6. A mechanism according to claim 4 wherein said first fork rod is for a reverse gear shift, and said second fork rod is for a high forward speed, and wherein said mechanism further comprises a third fork rod for a low forward speed, said third fork rod having a third bracket, said second bracket being disposed between said first and third bracket, said third bracket being disposed between said second bracket and said actuating arm of said select member.

7. A mechanism for a transmission having at least one synchronizer, comprising:
  a first fork rod for effecting a first gear shift of the transmission by moving in a first direction from a first neutral position to a first shift position, said first fork rod having a first bracket,
  a second fork rod connected with the synchronizer for effecting a second gear shift of the transmission through the sychronizer by moving in a second direction from a second neutral position to a second shift position, said second fork rod having a second bracket,
  a select member capable of moving said first fork rod when said select member is in a first select posture in which said select member is engaged with said first bracket, and moving said second fork rod when said select member is in a second select posture in which said select member is engaged with said second bracket, and
  engaging means comprising first means mounted on said select member and second means mounted on said second fork rod, said first and second means being placed in an engaged relation with each other when said select member is put in said first select posture, said first and second means being disengaged from each other when said first fork rod is moved through a predetermined distance from said first neutral position in said first direction by said select member in said first select posture,
  wherein said first and second fork rods are placed substantially in parallel to each other so that said first and second directions are axial directions toward a side of said transmission, and wherein one of said first and second means is translational means and the other of said first and second means is rotational means, said translational and rotational means being arranged so that said translational means travels a rectilinear path in said second direction and simultaneously said rotational means rotates about a rotation axis perpendicular to a plane substantially parallel to said rectilinear path according as said select member in said first select posture moves said first fork rod in said first direction from said first neutral position and simultaneously moves said second fork rod in said second direction from said second neutral position with said first and second means, and
  wherein said select member is fixedly mounted on a striking rod which is substantially parallel to said first and second fork rods so that said select member selects one of said first and second bracket by rotating about the axis of said striking rod and causes each of said first and second fork rod to move axially by moving rectilinearly along said first and second fork rods in a same direction, and wherein said rotational means comprises a rotational lever rotatable about said rotation axis and a restraining rod arranged to cause said rotational lever to rotate in a disengage direction according as said rotation axis moves rectilinearly in said second direction and to cause said rotational lever to move out of said rectilinear path of said translational means when said rotation axis reaches a predetermined position.

8. A mechanism according to claim 7 wherein said translational means is a projection fixedly mounted on said select member and said rotational means is mounted on said second bracket of said second fork rod.

9. A mechanism according to claim 8 wherein said rotational lever has an engage arm engageable with said projection and a restrain arm whose end is pivotally connected with said restraining rod, and said rod is arranged substantially in parallel to said first and second fork rods so that said rod causes said lever to rotate about a rotational axis by limiting said end of said restrain arm from moving rectilinearly in said second direction while said rotation axis of said lever is moved rectilinearly in said second direction.

10. A mechanism according to claim 9 wherein said engaging means further comprises a return spring disposed between said rotational lever and said second bracket for biasing said rotational lever to rotate in a return direction opposite to said disengage direction about said rotation axis.

11. A mechanism according to claim 10 wherein said rotational lever further has a return arm returning said second fork rod to said second neutral position by pushing said second bracket when said engage arm is disengaged from said projection and said rotational lever is rotated in said return direction by said return spring.

12. A mechanism according to claim 11 wherein said restraining rod extends from a first end pivotally connected with said restrain arm of said engage lever along said second fork rod in said second direction to a second end which abuts on a case of the transmission when said second fork rod is in said second neutral position, said restraining rod being axially slidably supported by a guide fixed to the case of the transmission.

13. A mechanism according to claim 7 wherein said translational means is a projection integral with said second bracket and said rotational means is mounted on said select member.

14. A mechanism according to claim 13 wherein said rotational lever has an engage arm which can engage with said projection of said second bracket, and a restrain arm whose end can abuts on a first end of said restraining rod, and said restraining rod extends from said first end to a second end substantially in parallel to said second fork rod in said second direction, said restraining rod being arranged so that said rod causes said rotational lever to rotate in said disengage direction by limiting said end of said restrain arm from moving rectilinearly in said second direction while said rotation axis of said lever is moved rectilinearly in said second direction.

15. A mechanism according to claim 14 wherein said engaging means further comprises a return spring for biasing said rotational lever to rotate in a return direction opposite to said disengage direction about said rotation axis.

16. A mechanism according to claim 15 wherein said first end of said restraining rod is slidably received in a hole of a first guide fixed to said select member, and said second end of said restraining rod is fixed to a second guide which is slidably mounted over said striking rod.

17. A mechanism according to claim 16 further comprising return means for returning said second forked rod to said second neutral position.

18. A mechanism according to claim 17 wherein said first fork rod effects a reverse gear shift of the transmission by moving in said first direction, and said second fork rod effects a forward speed shift.

* * * * *